US012397240B2

(12) United States Patent
Milton et al.

(10) Patent No.: US 12,397,240 B2
(45) Date of Patent: Aug. 26, 2025

(54) CRUTCH MOUNTABLE TOY ASSEMBLY

(71) Applicants: Robert Milton, Birmingham, AL (US); Kelsie Milton, Birmingham, AL (US)

(72) Inventors: Robert Milton, Birmingham, AL (US); Kelsie Milton, Birmingham, AL (US)

(*) Notice: Subject to any disclaimer, the term of this patent is extended or adjusted under 35 U.S.C. 154(b) by 236 days.

(21) Appl. No.: 18/221,248

(22) Filed: Jul. 12, 2023

(65) Prior Publication Data

US 2025/0017807 A1 Jan. 16, 2025

(51) Int. Cl.

*A63H 3/00* (2006.01)
*A45B 3/00* (2006.01)
*A61H 3/02* (2006.01)
*A63H 3/02* (2006.01)
*A63H 3/50* (2006.01)

(52) U.S. Cl.

CPC ............... *A63H 3/003* (2013.01); *A45B 3/00* (2013.01); *A61H 3/02* (2013.01); *A63H 3/02* (2013.01); *A63H 3/50* (2013.01)

(58) Field of Classification Search

CPC . A61H 3/02; A63H 3/003; A63H 3/02; A63H 3/50; A45B 3/00
USPC .... 446/71, 72, 369, 371, 372; 135/66, 120.1
See application file for complete search history.

(56) References Cited

U.S. PATENT DOCUMENTS 847,066 A * 3/1907 Hall ........................ A45B 3/00 472/137
1,488,890 A * 4/1924 Muller .................... A63H 3/18 446/338
1,641,057 A * 8/1927 Sweet .................... A63H 11/04 446/314
2,347,405 A * 4/1944 Ford ........................ A63H 3/02 446/369
D323,363 S 1/1992 Ely
5,078,640 A * 1/1992 Berman ................. A63H 3/003 446/72
5,114,185 A * 5/1992 Reedom .................. B60R 22/00 280/801.1
D378,551 S 3/1997 Shelnutt
5,978,962 A * 11/1999 Hamowy ........... A41D 13/0568 2/24

(Continued)

FOREIGN PATENT DOCUMENTS

WO WO03088866 10/2003

*Primary Examiner* — Robert Canfield

(57) ABSTRACT

A crutch mountable toy assembly for personalizing or decorating a crutch includes a three-dimensional body shape formed by an outer casing with a top end and a bottom end. The three-dimensional body shape defines a torso. A fastener capable of repeatedly opening and closing is attached to the torso. A resiliently compressible material is enclosed within the outer casing, defining a filling that expands the outer casing outwardly into the three-dimensional body shape. The three-dimensional body shape also has a channel therein extending into the top end and outwardly through the bottom end. The channel can encircle the crutch within the three-dimensional body shape. The outer casing also has a slit therein extending into the channel and outwardly through the outer casing. The channel is accessible through the slit. The fastener may be positioned adjacent to the slit, capable of overlaying and extending across the slit when the fastener is closed.

20 Claims, 7 Drawing Sheets

(56) References Cited

U.S. PATENT DOCUMENTS

| | | | | |
|---|---|---|---|---|
| 6,824,112 | B2 * | 11/2004 | Lange | A61J 9/0607 248/105 |
| 7,921,860 | B1 * | 4/2011 | McQueen | A45B 3/10 135/66 |
| 2003/0214162 | A1 | 11/2003 | Romano | |
| 2006/0011786 | A1 * | 1/2006 | Finney | A63H 3/02 248/118 |
| 2009/0056778 | A1 | 3/2009 | Dean | |
| 2009/0104837 | A1 | 4/2009 | Manwaring | |
| 2012/0227776 | A1 * | 9/2012 | Neitzel | A61H 3/02 135/73 |
| 2017/0216732 | A1 * | 8/2017 | Frazier | A63G 17/00 |
| 2019/0191941 | A1 * | 6/2019 | Brunelle | A63H 3/005 |
| 2019/0192980 | A1 * | 6/2019 | Vogel | A45C 13/42 |
| 2019/0374864 | A1 * | 12/2019 | Cragle | A63H 3/003 |
| 2021/0196060 | A1 * | 7/2021 | Lawson | A63H 3/02 |

* cited by examiner

CRUTCH MOUNTABLE TOY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to embellishments and more particularly pertains to a new embellishment for personalizing or decorating a crutch, cane, walker, or other mobility assisting device.

(2) Description of Related Art Including Information Disclosed Under 37 CFR 1.97 and 1.98

The prior art relates to embellishments and crutch mountable toy assemblies. Many prior art references relate to cushioning devices configured to increase the under-arm padding of a crutch. Other references relate to ornamental designs for crutch tips, such as fake shoes. However, there is a need in the field for a soft, plushie decorative embellishment designed to wrap around a shaft of a crutch, cane, walker, or other mobility assisting device, making the mobility assisting device more whimsical.

BRIEF SUMMARY OF THE INVENTION

An embodiment of the disclosure meets the needs presented above by generally comprising an embellishment configured for placement on a crutch. More specifically, the present disclosure contemplates a body that is configured to be removably positioned on a crutch. The body generally comprises an outer casing having a top end and a bottom end, the outer casing being formed into a three-dimensional body shape defining a torso. A fastener is positioned on and attached to the torso. The fastener is configured to repeatedly transition between an open position and a closed position. A resiliently compressible material is enclosed within the outer casing, defining a filling configured to expand the outer casing outwardly into the three-dimensional body shape. The three-dimensional body shape has a channel therein extending into the top end and outwardly through the bottom end. The channel is configured to encircle the crutch within the three-dimensional body shape. The outer casing is configured to exclude the filling from the channel. The outer casing also has a slit therein extending into the channel and outwardly through the outer casing. The outer casing is configured to exclude the filling from the slit so that the channel is accessible through the slit. The fastener may be positioned adjacent to the slit, the slit being configured to receive the crutch to position the three-dimensional body shape on the crutch when the fastener is in the open position, and the fastener overlaying and extending across the slit when the fastener is in the closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
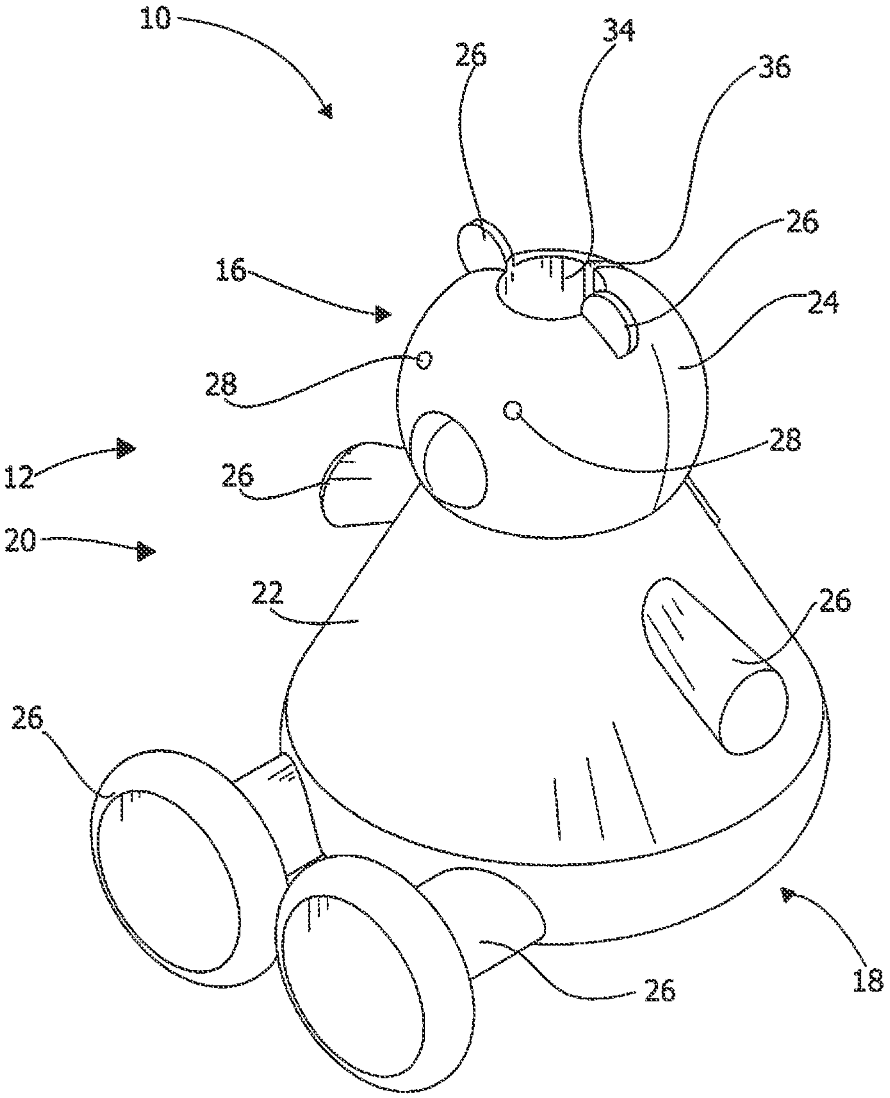
FIG. 1 is a top isometric view of a crutch mountable toy assembly according to an embodiment of the disclosure.

With reference now to the drawings, and in particular to FIGS. 1 through 9 thereof, a new embellishment embodying the principles and concepts of an embodiment of the disclosure and generally designated by the reference numeral 10 will be described.

As best illustrated in FIGS. 1 through 6, the crutch mountable toy assembly 10 generally comprises a body 12 that is configured to be removably positioned on a crutch, cane, walker, or other mobility assisting device 50. For brevity's sake, the crutch, cane, walker, or other mobility assisting device 50 will be referred to herein as a crutch 50. However, that is merely intended as a convenient shorthand and is not intended to limit the use of the disclosed embellishment for use in a crutch or to exclude the embellishment's use on other objects or devices. For example, the disclosed crutch mountable toy assembly 10 could be used to embellish nearly any vertically oriented column, rod, shaft, leg, or object.

The body 12 generally comprises an outer casing 14 having a top end 16 and a bottom end 18. The outer casing 14 may be formed into a three-dimensional body shape 20 defining a torso 22 and a head 24 that is attached to and extends outwardly from the torso 22. In exemplary embodiments, the head 24 may be proximate to the top end 16. Certain embodiments may also include a limb 26 that is attached to and extends outwardly from the torso 22. For example, the limb 26 may be positioned proximate to the bottom end 18. Some embodiments, such as the embodiment depicted in FIGS. 1-8, may include a plurality of limbs 26 arranged around the torso 22 as appendages including arms, legs, tails, or some combination thereof. Other embodiments, such as the one depicted in FIG. 9, may only include a torso 22.

In certain embodiments, a plurality of decorative pieces 28 may be affixed to the head 24. An example of such an embodiment is depicted in FIGS. 1-8. In other embodiments, such as the one depicted in FIG. 9, the plurality of decorative pieces 28 may be affixed on the torso 22. The plurality of decorative pieces 28 may be formed of any suitable material, including a rubber or plastic composite or by stitching. In some embodiments, the plurality of decorative pieces 28 are permanently affixed to the outer casing 14. In other embodiments, the plurality of decorative pieces 28 may be movably or temporarily attached to the outer casing 14, for example by a hook-and-loop adhesive, snaps, magnets, or another suitable fastening device. In such embodiments, the user can adjust the arrangement of the plurality of decorative pieces 28 for further embellishment, personalization, or whimsy.

Figure 2:
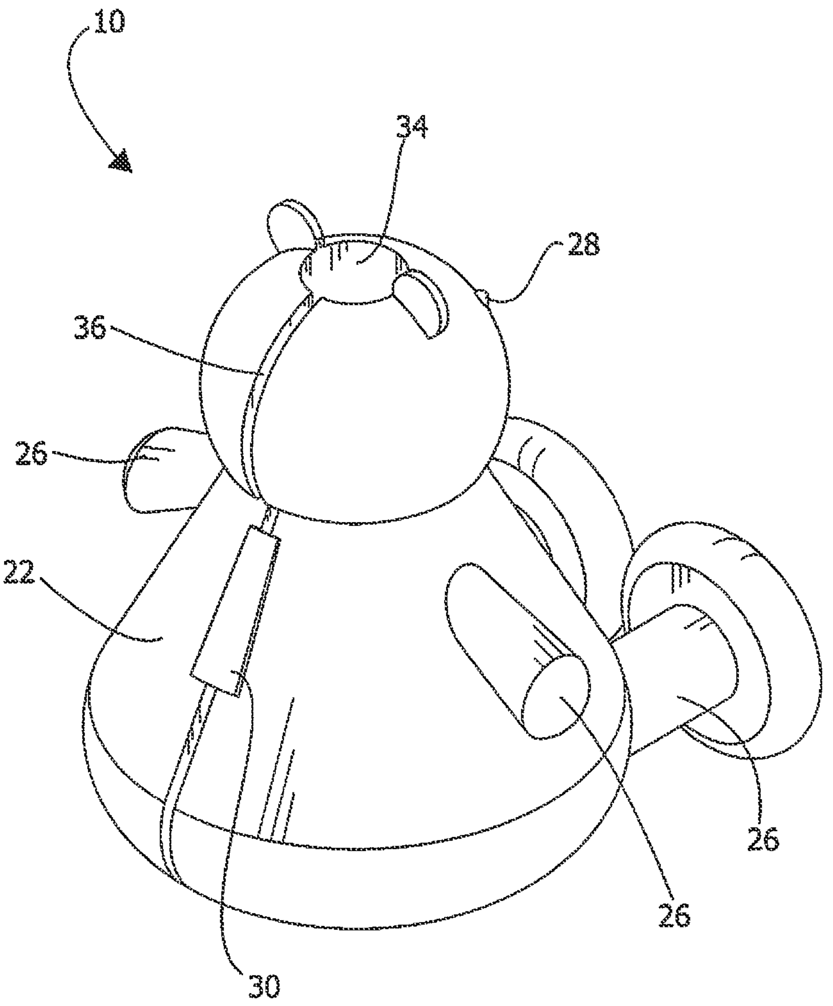
FIG. 2 is a rear isometric view of an embodiment of the disclosure.
Figure 3:
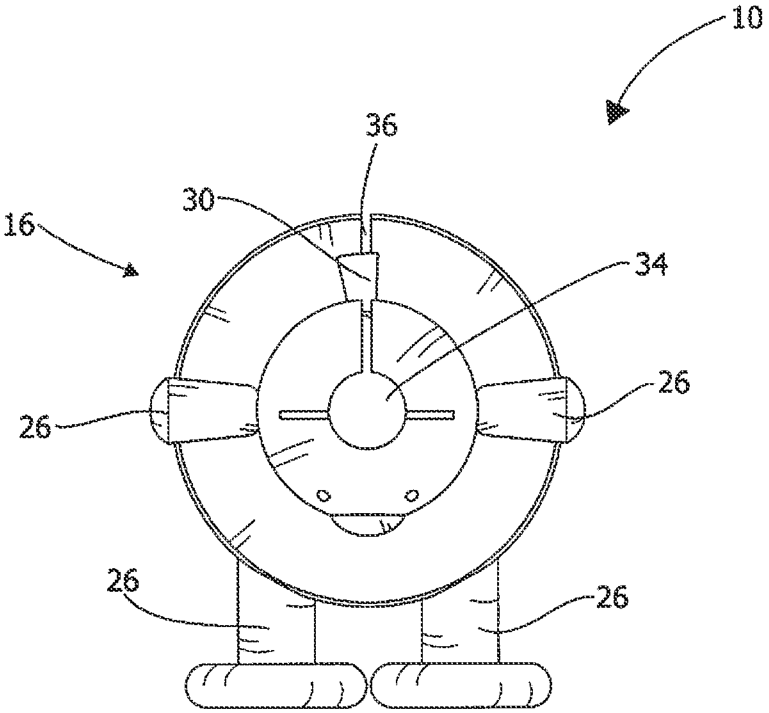
FIG. 3 is a top view of an embodiment of the disclosure.
Figure 4:
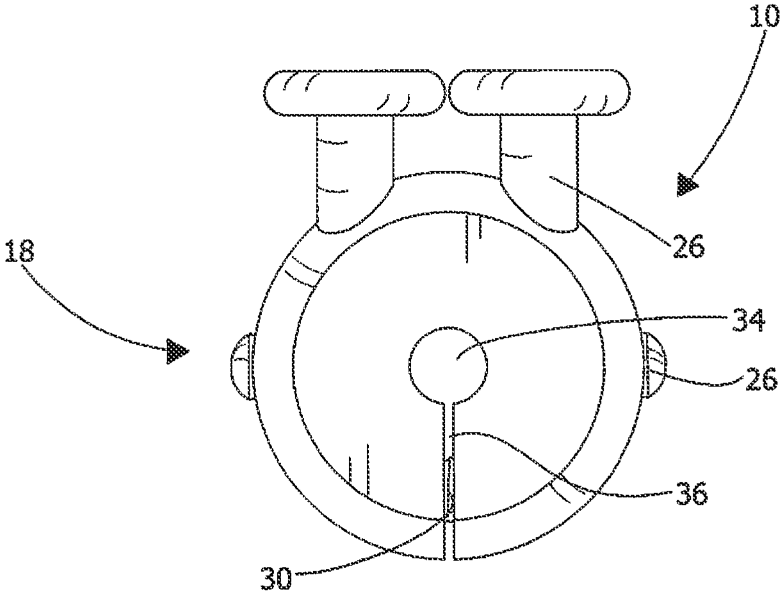
FIG. 4 is a bottom view of an embodiment of the disclosure.
Figure 7:
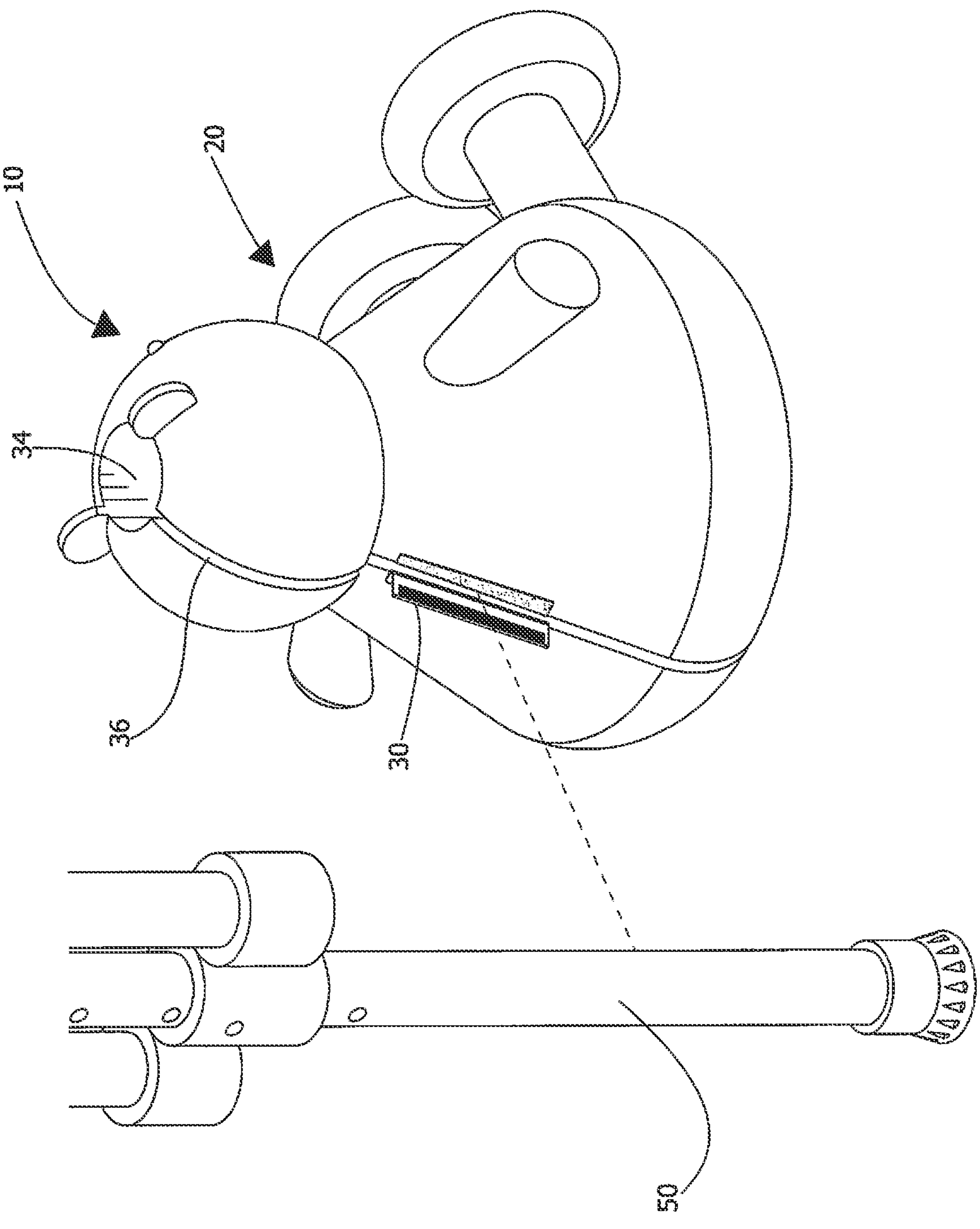
FIG. 7 is an exploded in-use view of an embodiment of the disclosure.

Embodiments of the present disclosure also include a fastener 30 that is positioned on and attached to the torso 22. The fastener 30 is configured to repeatedly transition between an open position, for example as depicted in FIG. 7, and a closed position, for example as depicted in FIG. 2. The fastener 30 may be formed of any suitable means, including a hook and loop adhesive material, an assembly of magnets, a snapping mechanism, a zipper, or some combination thereof.

Figure 6:
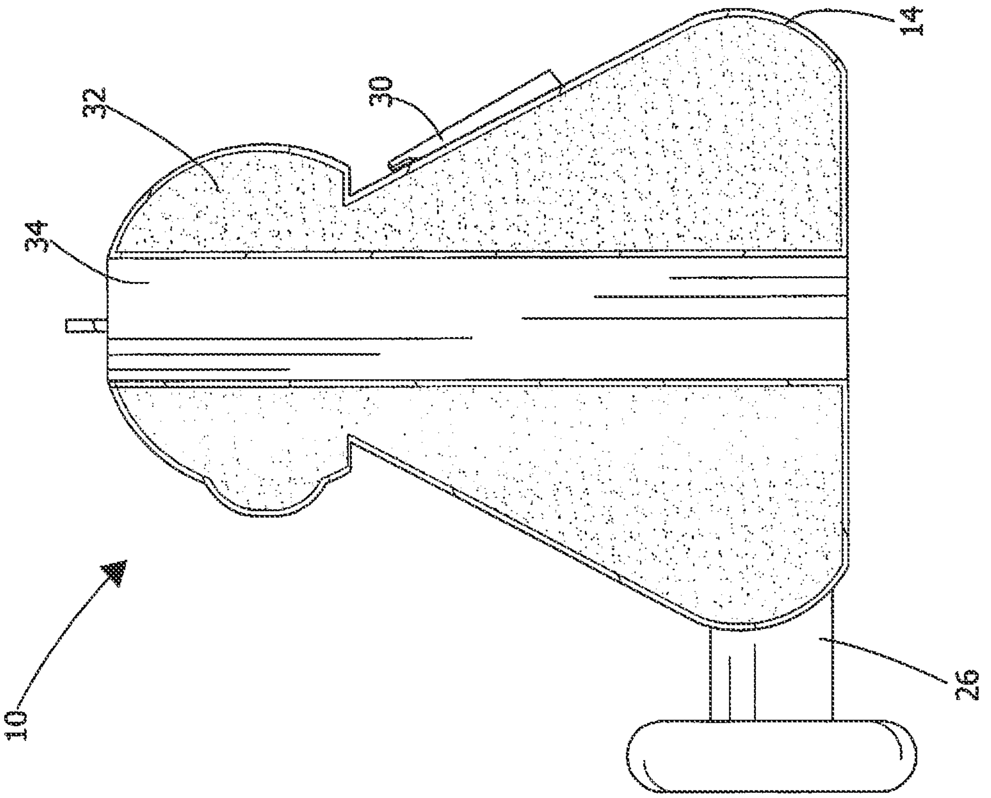
FIG. 6 is a cross-sectional view of an embodiment of the disclosure.
Figure 5:
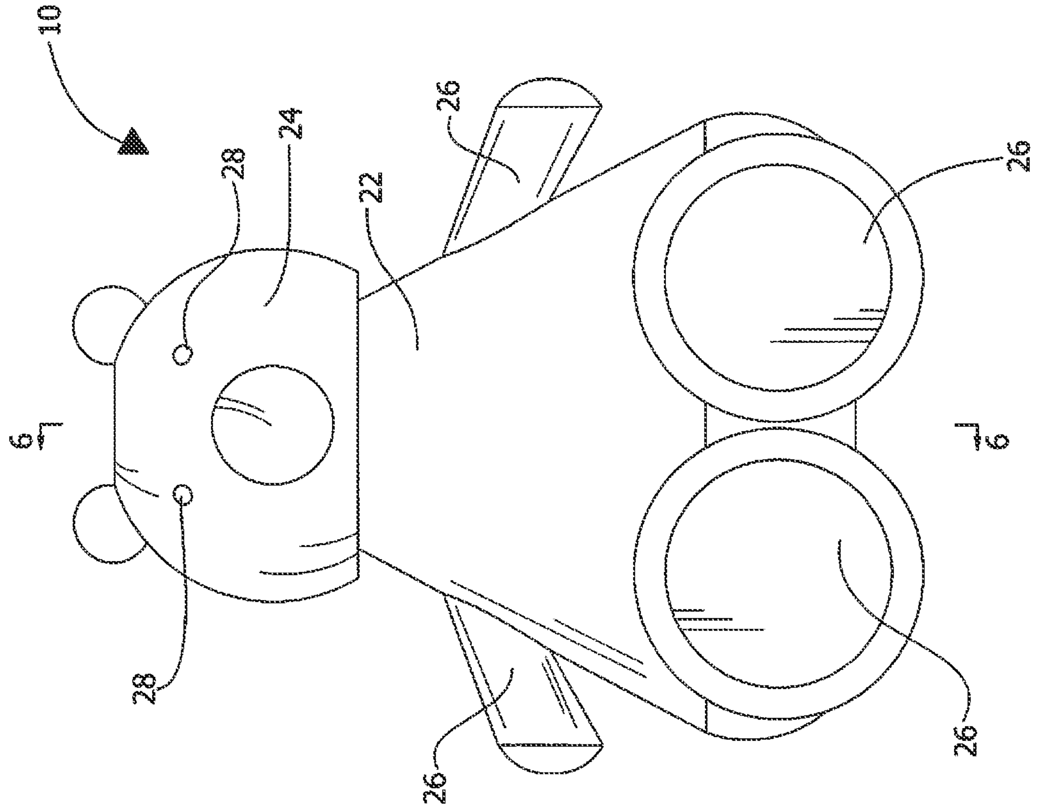
FIG. 5 is a front view of an embodiment of the disclosure.

As shown in FIG. 6, a resiliently compressible material 32 is enclosed within the outer casing 14. The resiliently compressible material 32 defines a filling 32 configured to expand the outer casing 14 outwardly into the three-dimensional body shape 20. The resiliently compressible material 32 may be formed of any soft and cushiony material, including cotton, linen, bamboo, hemp, polyester, rayon, or some combination thereof.

Embodiments of the three-dimensional body shape 20 have a channel 34 therein extending into the top end 16 and outwardly through the bottom end 18. The channel 34 is generally configured to encircle the crutch 50 within the three-dimensional body shape 20. The outer casing 14 is generally configured to exclude the filling 32 from the channel 34.

The outer casing 14 also includes a slit 36 therein extending into the channel 34 and outwardly through the outer casing 14. The outer casing 14 may generally be configured to exclude the filling 32 from the slit 36. In preferred embodiments, the channel 34 is accessible through the slit 36. The fastener 30 may be adjacent to the slit 36. The slit 36 is generally configured to receive the crutch 50, allowing the user to position the three-dimensional body shape 20 on the crutch 50 when the fastener 30 is in the open position, an example of which is shown in FIG. 7. The fastener 30 may be configured to overlay and extend across the slit 36 when the fastener 30 is in the closed position, an example of which is depicted in FIG. 2.

Figure 8:
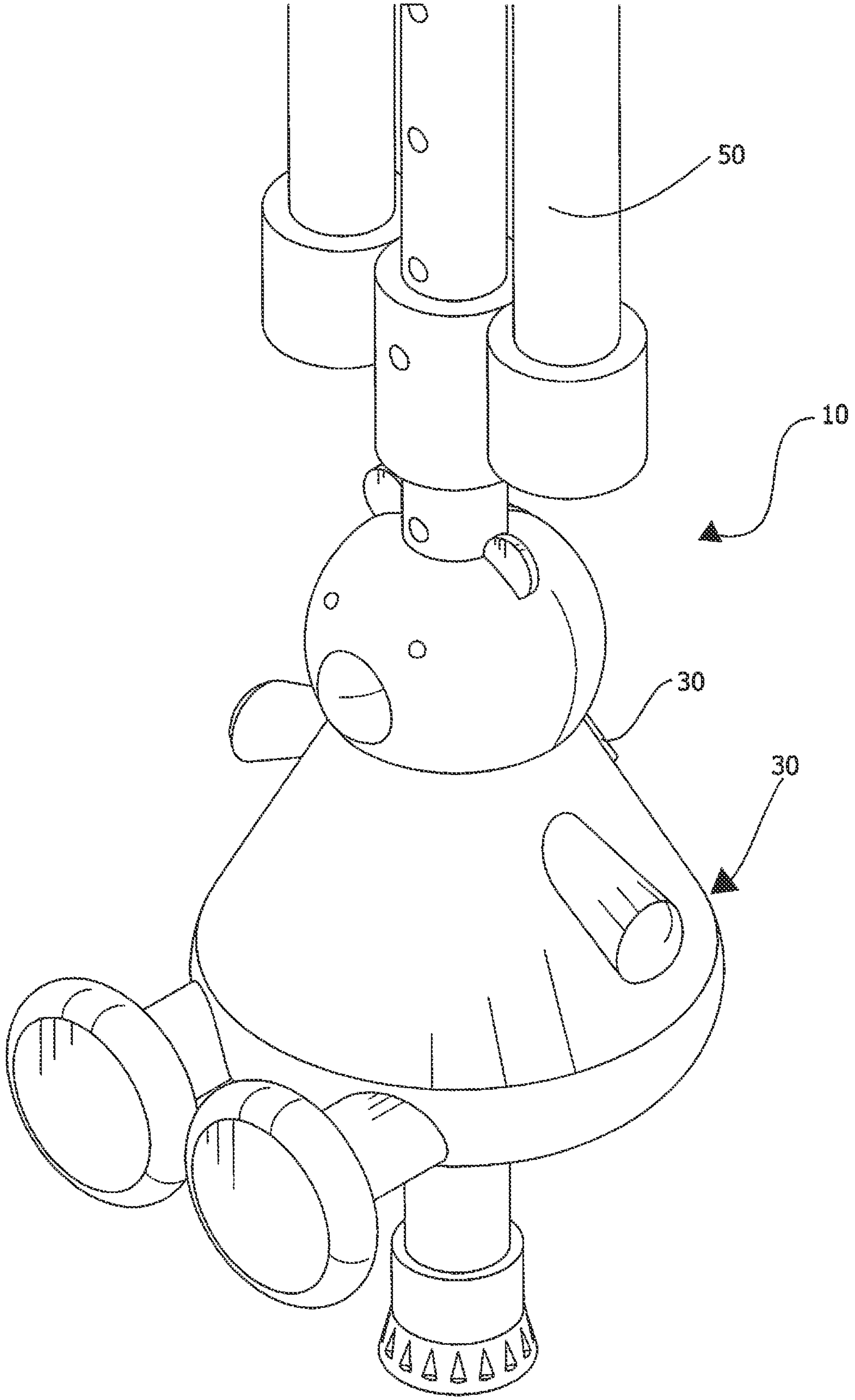
FIG. 8 is an in-use view of an embodiment of the disclosure.
Figure 9:
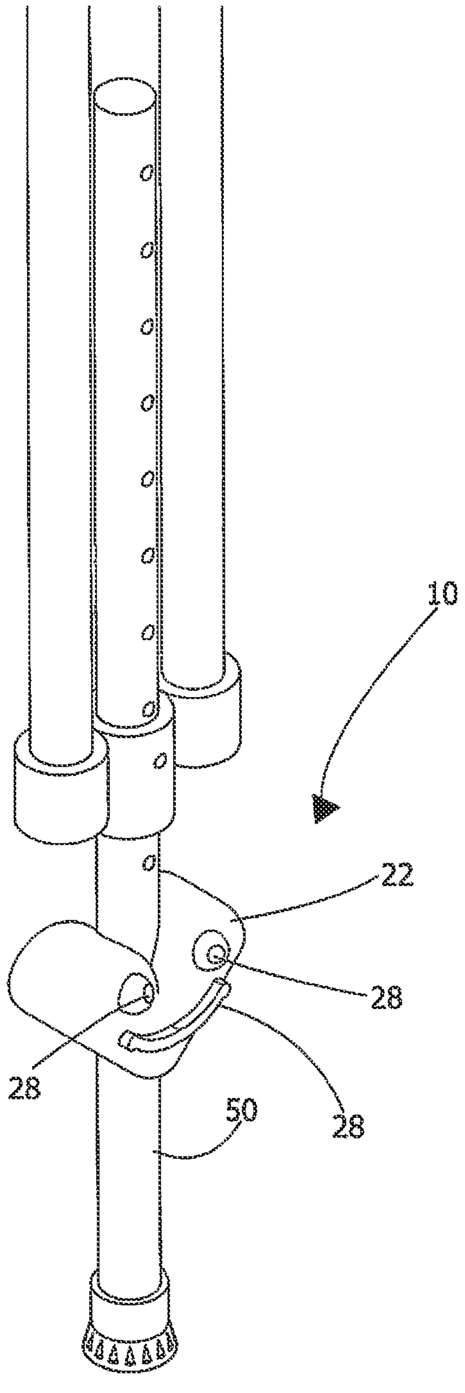
FIG. 9 is an in-use view of an alternative embodiment of the disclosure.

In use, the user may position the crutch mountable toy assembly 10 over a portion of a crutch 50. As shown in FIG. 7, the user can adjust the fastener 30 to the open position, then slide the crutch 50 through the slit 36, following the trajectory of the dashed line in FIG. 7. FIG. 8 provides an in-use view of the embodiment depicted by FIG. 7. FIG. 9 provides an in-use view of an alternative embodiment of the present disclosure. As shown in FIGS. 8 and 9, the crutch mountable toy assembly 10 can be placed near the bottom of the crutch 50. The channel 34 fits snuggly around the crutch 50, so that when the fastener 30 is in the closed position, the crutch mountable toy assembly 10 will remain attached to the crutch 50 and capable of maintaining its general position on the crutch 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A body being configured to be removably positioned on a crutch comprising:

an outer casing having a top end and a bottom end, the outer casing being formed into a three-dimensional body shape defining a torso;

a fastener being positioned on and attached to the torso, the fastener being configured to repeatedly transition between an open position and a closed position;

a resiliently compressible material being enclosed within the outer casing and defining a filling configured to expand the outer casing outwardly into the three-dimensional body shape;

the three-dimensional body shape having a channel therein extending into the top end and outwardly through the bottom end, the channel being configured to encircle the crutch within the three-dimensional body shape, the outer casing being configured to exclude the filling from the channel; and the outer casing having a slit therein extending into the channel and outwardly through the outer casing, the outer casing being configured to exclude the filling from the slit, the channel being accessible through the slit, the fastener being adjacent to the slit, the slit being configured to receive the crutch to position the three-dimensional body shape on the crutch when the fastener is in the open position, the fastener overlaying and extending across the slit when the fastener is in the closed position.

2. The body of claim 1, the three-dimensional body shape further defining a head attached to and extending outwardly from the torso.

3. The body of claim 2, the head further comprising a plurality of decorative pieces being affixed to the head, the plurality of decorative pieces being formed of a plastic composite or being formed by stitching.

4. The body of claim 3, wherein the plurality of decorative pieces is arranged to resemble a face.

5. The body of claim 2, wherein the head is proximate to the top end.

6. The body of claim 1, the three-dimensional body shape further defining a limb attached to and extending outwardly from the torso.

7. The body of claim 6, wherein the limb is proximate to the bottom end.

8. The body of claim 6, the limb further comprising a plurality of limbs arranged around the torso in a configuration depicting an arm, a leg, a tail, or some combination thereof.

9. The body of claim 1, wherein the fastener is formed of a hook and loop adhesive material, an assembly of magnets, a snap mechanism, a zipper mechanism, or some combination thereof.

10. The body of claim 1, wherein the resiliently compressible material is formed of a soft and cushiony material selected from the group consisting of cotton, linen, bamboo, hemp, polyester, rayon, or some combination thereof.

11. A body being configured to be removably positioned on a crutch comprising:

an outer casing having a top end and a bottom end, the outer casing being formed into a three-dimensional body shape defining a torso;

a fastener being positioned on and attached to the torso, the fastener being configured to repeatedly transition between an open position and a closed position;

a resiliently compressible material being enclosed within the outer casing and defining a filling configured to expand the outer casing outwardly into the three-dimensional body shape, the resiliently compressible material being formed of a soft and cushiony material, the soft and cushiony material being cotton;

the three-dimensional body shape having a channel therein extending into the top end and outwardly through the bottom end, the channel being configured to encircle the crutch within the three-dimensional body shape, the outer casing being configured to exclude the filling from the channel; and the outer casing having a slit therein extending into the channel and outwardly through the outer casing, the outer casing being configured to exclude the filling from the slit, the channel being accessible through the slit, the fastener being adjacent to the slit, the slit being configured to receive the crutch to position the three-dimensional body shape on the crutch when the fastener is in the open position, the fastener overlaying and extending across the slit when the fastener is in the closed position.

12. The body of claim 11, the three-dimensional body shape further defining a head attached to and extending outwardly from the torso.

13. The body of claim 12, the head further comprising a plurality of decorative pieces being affixed to the head, the plurality of decorative pieces being formed of a plastic composite or being formed by stitching.

14. The body of claim 11, the torso further comprising a plurality of decorative features being affixed to the torso, the plurality of decorative pieces being arranged to resemble a face.

15. The body of claim 11, the three-dimensional body shape further defining a limb attached to and extending outwardly from the torso.

16. The body of claim 15, wherein the limb is proximate to the bottom end.

17. The body of claim 15, the limb further comprising a plurality of limbs arranged around the head and the torso in a configuration depicting an arm, a leg, a tail, an ear, or some combination thereof.

18. The body of claim 11, wherein the fastener is formed of a hook and loop adhesive material, an assembly of magnets, a snap mechanism, a zipper mechanism, or some combination thereof.

19. The body of claim 11, wherein the resiliently compressible material is formed of a soft and cushiony material such as cotton, linen, bamboo, hemp, polyester, rayon, or some combination thereof.

20. A body being configured to be removably positioned on a crutch comprising:

an outer casing having a top end and a bottom end, the outer casing being formed into a three-dimensional body shape defining a torso, a head being attached to and extending outwardly from the torso, the head being proximate the top end, a limb being attached to and extending outwardly from the torso, the limb being proximate the bottom end;

a plurality of decorative pieces being permanently affixed to the head, the plurality of decorative features being formed of a plastic composite or being formed by stitching;

a fastener being positioned on and attached to the torso, the fastener being configured to repeatedly transition between an open position and a closed position, the fastener being formed of a hook and loop adhesive material;

a resiliently compressible material being enclosed within the outer casing and defining a filling configured to expand the outer casing outwardly into the three-dimensional body shape, the resiliently compressible material being formed of a soft and cushiony material, the soft and cushiony material being cotton;

the three-dimensional body shape having a channel therein extending into the top end and outwardly through the bottom end, the channel being configured to encircle the crutch within the three-dimensional body shape, the outer casing being configured to exclude the filling from the channel; and the outer casing having a slit therein extending into the channel and outwardly through the outer casing, the outer casing being configured to exclude the filling from the slit, the channel being accessible through the slit, the fastener being adjacent to the slit, the slit being configured to receive the crutch to position the three-dimensional body shape on the crutch when the fastener is in the open position, the fastener overlaying and extending across the slit when the fastener is in the closed position.

* * * * *